United States Patent [19]

Hori et al.

[11] 4,050,549
[45] Sept. 27, 1977

[54] DISC BRAKE DEVICE FOR MOTORCYCLES AND THE LIKE

[75] Inventors: Toshio Hori, Nagano; Tadao Nakagawa, Ueda, both of Japan

[73] Assignee: Nisshin Kogyo Kabushiki Kaisha, Ueda, Japan

[21] Appl. No.: 680,512

[22] Filed: Apr. 26, 1976

[30] Foreign Application Priority Data

Jan. 6, 1976  Japan .................................. 51-371[U]

[51] Int. Cl.² ............................................. F16D 55/08
[52] U.S. Cl. ........................... 188/72.8; 188/73.3
[58] Field of Search .............. 188/71.7, 72.7, 72.8, 188/72.9, 73.3, 196 M, 72.4

[56] References Cited

U.S. PATENT DOCUMENTS

| 2,612,968 | 10/1952 | Hood | 188/72.8 |
| 3,024,873 | 3/1962 | Wilkinson | 188/71.7 |
| 3,155,195 | 11/1964 | Brawerman | 188/72.8 |
| 3,500,966 | 3/1970 | Birge | 188/72.4 |
| 3,628,639 | 12/1971 | Daley | 188/73.3 |
| 3,675,741 | 7/1972 | Frei et al. | 188/72.8 |
| 3,881,576 | 5/1975 | Haraikawa et al. | 188/73.3 |
| 3,920,102 | 11/1975 | Ito | 188/72.8 |

FOREIGN PATENT DOCUMENTS

| 203,453 | 10/1908 | Germany | 188/72.9 |
| 674,673 | 11/1964 | Italy | 188/72.8 |
| 628,651 | 9/1949 | United Kingdom | 188/72.9 |

Primary Examiner—Trygve M. Blix
Assistant Examiner—Edward R. Kazenske
Attorney, Agent, or Firm—Haseltine, Lake & Waters

[57] ABSTRACT

A disc brake device for motor-cycles and the like, constructed with a fixing bracket of inverted U-shape, having a flat horizontal roof plate and downwardly extending side plates, a pair of caliper arms joined together by a connecting rod and slidably mounted thereon in the space provided between the side plates, a fixed friction brake pad held in one of the caliper arms, a movable friction brake pad slidably inserted in a bore formed in the other caliper arm so as to be clamped with a brake disc of a wheel of the vehicle, interposed between the friction brake pads by a brake actuating lever through a screwing action between a male threaded nut member and a female threaded screw member embedded in the caliper arm that accommodates the movable friction pad, and an adjustment bolt provided concentrically with the screw and nut members to compensate wear occurring in the movable friction pad, the brake actuating lever being fitted to a square shaft provided at the end of the screw member, and tightly fastened thereto by a lock nut.

1 Claim, 4 Drawing Figures

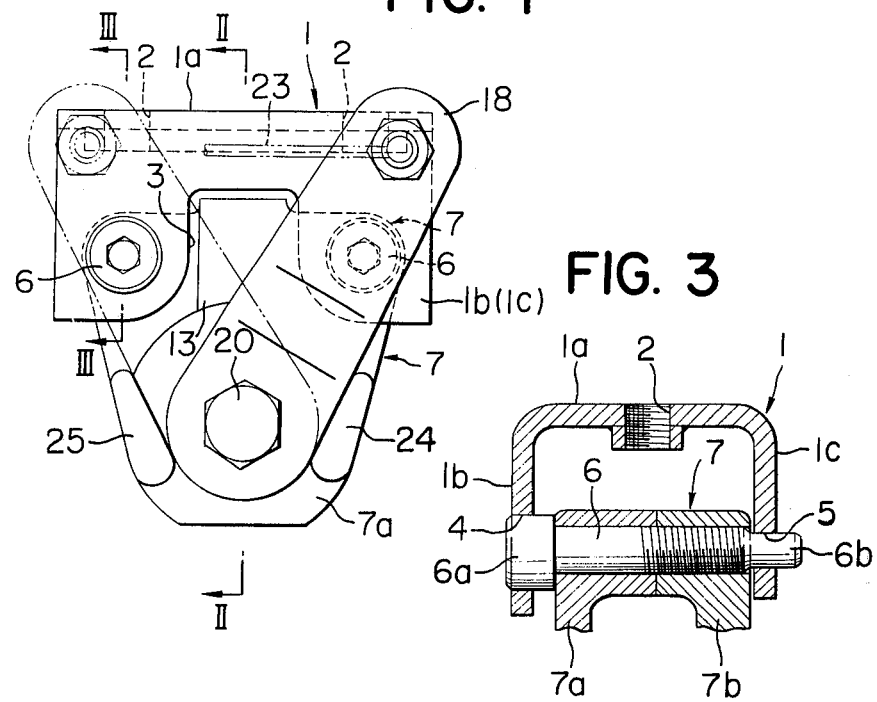
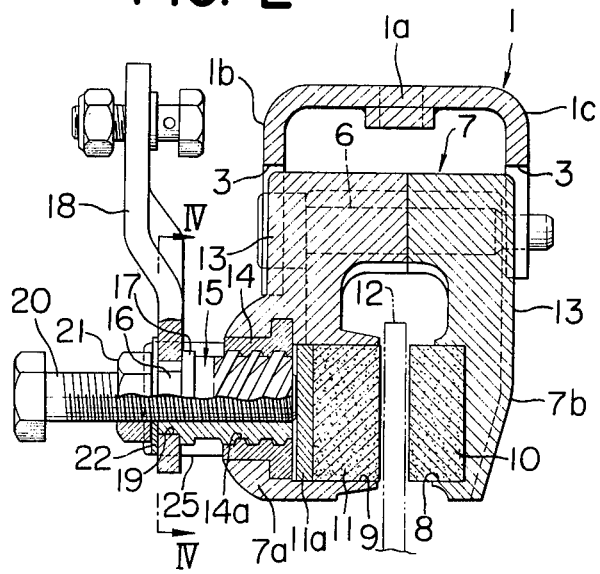

DISC BRAKE DEVICE FOR MOTORCYCLES AND THE LIKE

SUMMARY OF THE INVENTION

It is an object of the present invention to provide a small but effective and easily serviceable mechanical disc brake device adapted to be installed in a small type automotive vehicle such as, for example, a motorcycle, a snow-mobile, and so forth, where the space available for the installation of such a brake device is considerably limited.

It is another object of the present invention to provide a small mechanical disc brake device which is capable of being operated accurately, and wherein the thrust exerted by forward rotation of a threaded screw is utilized as an urging force toward a movable friction brake pad to be pressed firmly against a brake disc, and yet the wear of the friction brake pad can be readily compensated by a simple adjustment of a screw threaded bolt.

The foregoing objects, other objects, as well as the specific construction and operation of the mechanical disc brake according to the present invention will become more apparent and understandable from the following detailed description thereof, when read in conjunction with the accompanying drawing.

BRIEF DESCRIPTION OF THE DRAWING

In the drawing:

FIG. 1 is a side elevational view of a preferred, exemplary embodiment of the disc brake device according to the present invention;

FIG. 2 is a cross-sectional view of the disc brake device shown in FIG. 1, when taken along the line II—II therein;

FIG. 3 is also a cross-sectional view of the disc brake device shown in FIG. 1, when taken along the line III—III therein; and FIG. 4 is a cross-sectional view, when taken along the line IV—IV in FIG. 2, showing the connection of a brake actuating lever to a pressure applying mechanism for the friction pads.

DETAILED DESCRIPTION OF PREFERRED EMBODIMENT

Referring now to FIGS. 1, 2, and 3, reference numeral 1 designates a fixing bracket having an inverted U-shaped cross-section, wherein a horizontally extending roof plate 1a is provided with a perforated hole 2 for fitting the bracket to any appropriate stationary part of a vehicle body, in which the disc brake device is to be installed. Downwardly extending side plates 1b and 1c are provided at both front and rear end parts thereof, with two pairs of guide holes 4,5, one having a larger diameter than the other. A notched portion 3 is formed in each of the side plates 1b, 1c between these holes 4,5. Through each pair of the guide holes 4,5, there is inserted a sliding rod 6 in a freely slidable manner with the ends thereof resting in the guide holes. Onto the sliding rods 6, there is fixedly mounted a brake caliper 7 consisting of a pair of left and right arm portions or halves 7a and 7b.

A fixed friction pad 10 is fittedly carried in a recessed portion 8 formed in the inner surface of the right caliper arm 7b, while a movable friction pad 11 having a liner 11a on the back surface thereof is slidably inserted in a cylindrical bore 9 formed in the left caliper arm 7a at a position substantially opposite the recessed portion 8 in the right caliper arm 7b. Between these friction pads 10 and 11, there is interposed a brake disc 12 which rotates along with a wheel of the vehicle. A gap to permit parallel movement of the brake caliper 7 with respect to the axis of the brake disc 12 is provided between the downwardly extending left and right side plates 1b and 1c of the fixing bracket 1 and the left and right arm portions 7a and 7b of the brake caliper 7, respectively. In the middle portion on the external lateral side surfaces of the arm portions 7a and 7b of the brake caliper 7, there are formed raised reinforcing ribs 13 which are received in the afore-mentioned notched portions 3.

Each sliding rod 6 is in the form of a socket bolt consisting of a head part 6a adapted to be inserted into, and rest in, the guide hole 4 having the larger diameter, and a tip end part 6b adapted to be inserted into, and rest in, the guide hole 5 having the smaller diameter. By this sliding rod 6, the arm portions 7a and 7b of the brake caliper 7, formed by split-molding, are integrally joined together. In this construction, the sliding rods 6 also serve as connecting members for the caliper arms 7a and 7b with the consequence that the number of the assembly parts is reduced, hence a simpler construction of the device is achieved.

At the time of molding the left caliper arm 7a, a female threaded nut member 14 is embedded at a position facing one open end portion of the bore 9, in which the movable friction pad 11 is inserted, in such a manner that a screw-threaded hole 14a of this nut member 14 is open to both the outside surface of the left caliper arm 7a and the open end of the bore 9. With this member 14, a male threaded screw member 15 is engaged when it is rotated from outside, or, from the left side as viewed in the drawing. These members 14, 15 are provided on their peripheral surfaces with coarse multiple threads so that the screw member 15 is able to produce a relatively large axial displacement with a slight or small rotational angle.

At the outer end of the screw member 15, there are integrally formed a square shaft 16 as a lever fitting shaft, and a flange 17 at the base of this square shaft 16. A square hole 19 formed in the base part of a brake actuating lever 18 is snugly fitted to this square shaft 16. Furthermore, an adjustment bolt 20 is screw-engaged with the center part of the screw member 15, the tip end of which bolt contacts the lining pad 11a of the movable friction pad 11, and a lock nut 21 provided on the bolt 20 is tightened against the square shaft 16 and the brake actuating lever 18 through a washer 22. The gauge or thickness of the lever 18 is equal to, or slightly larger than the length of the square shaft 16. With this single lock nut 21, the brake actuating lever 18 is fixed by the square shaft 16, and, at the same time, the adjustment bolt 20 and the screw member 15 are fixed together.

A wire 23 connected to a brake operating member, and a return spring (neither being shown) for the brake actuating lever are connected to the lever 18. Return oscillation of the lever 18 to its released position due to the return spring is restricted by a stop 24 projectingly provided on the outer side surface of the brake caliper 7. Another stop 25, also provided on the outer side surface of the caliper 7, symmetrical with the 24, restricts the return oscillation of the lever 18 when its actuating direction is reversed.

In the following, the operation of the disc brake device according to the present invention will be explained. When the lever 18 is caused to oscillate in the leftward direction in FIG. 1 by pulling the wire 23, the screw member 10 and the adjustment bolt 20 fixed together with the brake actuating lever 18 by means of the lock nut 21 also rotate therealong, and, at the same time, they cause axial displacement toward the movable friction pad 11 owing to the mutual engagement between the members 14 and 15. As a result, the movable friction pad 11 receives a thrust from the adjustment bolt 20 to move toward the brake disc 12 so as to be press-engaged therewith at its left side surface, whereupon its reactional force acts on the brake caliper 7 through the adjustment bolt 20 and the members 14 and 15. On account of this, the sliding rods 6 which integrally connect the left and right arm portions 7a and 7b of the caliper 7 move leftward along and through the respective guide holes 4,5. With the leftward movement of the sliding rods 6, the fixed friction pad 10 is press-engaged with the right side surface of the brake disc 12, whereby the latter is subjected to a balanced, uniform press-contacting force from both friction pads 10 and 11, thereby being braked. At this time, the braking torque imposed on the brake caliper 7 is held by the sliding rods 6.

When the friction pads 10 and 11 are worn out by the sliding friction with the brake disc 12, and the actuation angle of the brake actuating lever 18 excessively increases, the lock nut 21 is first loosened, and then the adjustment bolt 20 is properly turned to increase its projection from the screw member 15 so as to push forward the movable friction pad 11, whereby the wear of the friction pads 10 and 11 can be compensated. After the required adjustment, the lock nut 21 should, needless to say, be returned to its initial tightened state.

As stated in the foregoing, according to the present invention, it is always possible to secure satisfactory braking action, because of the extremely simple construction, wherein the screw member 15, having relatively large threads rotatable by the actuating lever 8, is screw-engaged in the left arm 7a of the brake caliper 7, having therein the movable friction pad 11, can readily urge the pad 11 toward the brake disc, and, at the same time, cause the brake caliper 7 to slide in the direction away from to the movable friction pad 11, whereby the engaging force of the fixed and movable friction pads 10 and 11 to the brake disc 12 can be balanced without failure.

Since the tip end of the adjustment bolt 20, which is screw-engaged with the center part of the screw member 15, is in contact with the back surface of the movable friction pad 11, wear of the friction pads 10 and 11 can be compensated by the simple operation of rotating the adjustment bolt 20 alone without removing the brake actuating lever 18. Also, the abovementioned arm 7a supports the movable friction pad 11, and occupies a relatively narrow space to permit being screw-engaged with the screw member 15, whereby a small-sized disc brake device is obtained which is particularly suitable for use in snow-mobiles or motorcycles having only limited space for the installation of the brake.

Although the present invention has been described with reference to a preferred embodiment thereof, it should be understood that the embodiment is illustrative only, and not restrictive, and that any change and modification may be made by those skilled in the art within the spirit and scope of the present invention.

What is claimed is:

1. A disc brake device for motorcycles and the like, comprising: a fixing bracket of inverted U-shape; a brake caliper slidably carried by said bracket and having a pair of opposite arms disposed in straddling relation to a brake disc of a motorcycle; a friction pad fixed to one of said arms, a movable friction pad slidably inserted into a cylindrical bore formed in the other arm; said disc being interposed between said fixed and said movable friction pads so as to be clamped thereby; a threaded nut member provided in said other arm, a threaded screw member of a relatively large lead for screw engagement with said nut member and having a square shaft formed at the outer end thereof; a brake actuating lever fitted on said shaft, and an adjustment bolt screw-engaged through the center of said screw member and extending therethrough so as to contact at one end thereof the rear face of said movable friction pad; wherein said caliper includes a pair of separate halves that constitute said arms; a pair of sliding rods extend through said caliper halves, to be threadedly engaged by said halves for integral connection thereof; said rods have enlarged head portions and reduced tip-end portions, projecting from opposite side surfaces of said caliper halves so as to be fitted in associated guide holes formed in opposite side portions of said bracket for limited axial movement thereof along with said caliper halves; and wherein a lock nut is threadedly fitted on said bolt for tightly fixing said lever against a flanged portion of said shaft, and also for holding said bolt in a properly adjusted position against rotation thereof relative to said screw member.

* * * * *